Patented July 22, 1952

2,604,484

UNITED STATES PATENT OFFICE 2,604,484

MANUFACTURE OF ZINC DITHIOCARBAMATE AMINE COMPLEXES

John C. McCool, Akron, Ohio, assignor to The B. F. Goodrich Company, New York, N. Y., a corporation of New York No Drawing. Application November 13, 1950, Serial No. 195,455

5 Claims. (Cl. 260—429)

This invention relates to an improved method of preparing known complex chemical compounds heretofore resulting from the reaction of a zinc dithiocarbamate with an amine. Such compounds are also called "amine addition salts of zinc dithiocarbamates" and are sometimes referred to herein for brevity simply as "complex products" or "complexes."

It is known that zinc salts of dithiocarbamic acids will react with amines, especially amines which are aliphatic in nature such as alkyl and cycloalkyl amines, to form definite but complex chemical compounds of indeterminate structure. In such complexes, the amine molecule may be joined to the zinc atom by coordinate covalences analogous to the manner in which ammonia is joined to metal atoms in the well-known metal-ammonia complexes, but there has been no conclusive proof of such structure.

It is also known that such complex reaction products possess utility as accelerators for the vulcanization of rubber (see U. S. Patent 2,321,-301) and as active ingredients in various kinds of pesticidal and horticultural compositions (see the copending application of William D. Stewart and John H. Standen, Ser. No. 586,281 filed April 2, 1945 now Patent 2,588,428 and the copending application of Sever L. Hopperstead, Ser. No. 713,114 filed November 29, 1946 now Patent 2,600,245.

The only method heretofore known for preparing such complexes involves the initial preparation of the zinc dithiocarbamate (in the known manner by reacting a zinc salt with an ammonium alkali metal dithiocarbamate) followed by reacting the zinc dithiocarbamate with a molecular excess of the amine, the latter reaction generally being effected by addition of the amine to a suspension or slurry of the zinc dithiocarbamate in water with vigorous agitation and with subsequent refluxing of the mixture, after which the reaction mixture is cooled and the reaction product separated by filtering.

While this method yields products suitable for use in accelerating the vulcanization of rubber, difficulties are encountered when products so prepared, especially on a large scale, are employed as active ingredients in fungicidal and horticultural compositions.

One of these difficulties is that compositions containing such products, when prepared on a commercial scale, are somewhat phytotoxic. The phytotoxicity has been traced to the presence of unreacted or free zinc dithiocarbamate carried by the complex product. Another difficulty is that such products do not form stable aqueous dispersions but rather often result in dispersions in which 25% or more of the complex settles out and is not available for application.

I have now discovered an improved method for preparing the zinc dithiocarbamate-amine complex products. By this new process, the desired product is formed on a commercial scale, as a finely divided crystalline solid which disperses readily and forms a stable dispersion in aqueous solutions of surface active agents (wetting and dispersing agents) and is formed as a homogeneous product containing no appreciable unreacted or free zinc dithiocarbamate.

My improved process for preparing the complex products consists of the following steps. First an aqueous reaction medium containing both an amine and a water-soluble dithiocarbamate is prepared. Generally such water-soluble salts as the sodium, potassium or ammonium salts of dithiocarbamic acids will be found most useful because they are more readily obtainable. It will be found to be desirable in many cases, when the amine is water soluble, to prepare an aqueous solution of the amine and an aqueous solution of the dithiocarbamate and then combine the two solutions, for each material will dissolve more rapidly alone. As the second step, an aqueous solution of a water-soluble inorganic zinc salt is added to the aqueous medium containing the dithiocarbamate and the amine. The resulting aqueous mixture is then preferably stirred mildly and heated above 50° C. for a short period, preferably ½ to 2 hours, to speed up the reaction. A reaction temperature of from 50° to 75° C. will give good results and is preferred. After the heating and stirring step, the complex products precipitate in high yields as finely-divided crystalline solids and as substantially pure compounds and can be recovered by removal of the aqueous phase in any desired manner. The total quantities of reactants to be used in this improved process can be varied according to the amount of the product desired but the reactants should be employed in the proportions of one mole of the water-soluble inorganic zinc salt for each mole of amine used and one mole of amine should be used for each two moles of water-soluble dithiocarbamate.

The process described above does not involve the formation of a water-insoluble zinc dithiocarbamate as an intermediate but rather the complex product is formed directly. As a result it does not contain any free or unreacted zinc dithiocarbamate as do complex products which are obtained by the previously known processes of reacting a zinc dithiocarbamate with an amine. The complex products produced by the present method, however, are chemically identical with the known zinc dithiocarbamate amine reaction products when the latter are obtained in pure form.

The complex products formed by the process of this invention are initially obtained as substantially pure complex compounds. They are not phytotoxic and they are much more stable chemically than those prepared according to the processes heretofore known.

The water-soluble dithiocarbamates which are employed in the process of this invention include any of the sodium or potassium or ammonium salts of dithiocarbamic acids. Dithiocarbamic acids possess the structural formula

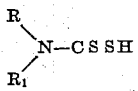

where each of R and $R_1$ may represent hydrogen or an organic radical, where the R groups are organic radicals each can be the same as in the case of two methyl groups or they each may be different organic groups. Also R and $R_1$ together can be one bivalent organic radical such as pentamethylene or oxytetramethylene. The R groups when individual organic radicals include such representative groups as alkyl radicals, alicyclic radicals, aryl radicals, aralkyl radicals and the like. The water-soluble dialkyl dithiocarbamates, especially the dimethyl dithiocarbamates, are particularly productive of useful complex products and are preferred reactants. Other illustrative specific dithiocarbamic acids whose water-soluble salts can be employed as reactants for the process of this invention are for example cyclohexyl dithio carbamic acid, tetrahydrofurfuryl dithiocarbamic acid, benzyl dithiocarbamic acid, diethyl dithiocarbamic acid, dibutyl dithiocarbamic acid, diamyl dithiocarbamic acid, ethyl cyclohexyl dithiocarbamic acid, dibenzyl dithiocarbamic acid, ditetrahydrofurfuryl dithiocarbamic acid, pentamethylene dithiocarbamic acid as well as the dithiocarbamic acids derived by reaction of carbon disulfide with such amines as di-n-propyl amine, diisopropyl amine, N-methyl cyclohexyl amine, N-butyl cyclohexyl amine, N-methyl-o-methyl cyclohexyl amine, N-methyl tetrahydro alpha furfuryl amine, N-butyl tetrahydro alpha furfuryl amine, morpholine, symmetrical diethyl ethylene diamine, symmetrical dibutyl trimethylene diamine, N-ethyl-o-methyl cyclohexyl amine, methyl propyl amine, methyl isobutyl amine, 2-ethyl butyl amine, methyl ethyl amine, and such other amines as alkyl piperidines, pyrrole, pyrroline, pyrrolidine, di-(2-ethyl butyl) amine, di-(2-ethylhexyl) amine, dialkoxy propyl amine, alkyl alkoxy amine and the like.

The amine reactant used in the process of this invention may in general be any aliphatic, alicyclic araliphatic or saturated heterocyclic amine, but primary and secondary aliphatic and cycloaliphatic amines are preferred. Specific amines illustrating the scope of amine reactants include methyl amine, ethyl amine, butyl amine, amyl amine, hexadecyl amine, octadecyl amine, dimethyl amine, diethyl amine, dibutyl amine, diamyl amine, trimethyl amine, triamyl amine, ethylene diamine, hexadecyl propyl diamine, dibutyl ethylene diamine, diethylene triamine, cyclohexyl amine, piperidine, morpholine, ethyl cyclohexyl amine, furfuryl amine, tetrahydrofurfuryl amine, ditetrahydrofurfuryl amine, N-butyl tetrahydrofurfuryl amine, benzyl amine, mono-o-tolyl ethylene diamine, di(beta-phenethyl) amine, hexahydro ortho or para toluidine, N-methyl cyclohexyl amine, N-methyl tetrahydro alpha furfuryl amine, N-ethyl tetrahydro alpha furfuryl amine, N-methyl hexahydro o-toluidine, symmetrical diethyl trimethylene diamine, symmetrical dipropyl ethylene diamine, beta-phenethyl amine, N-methyl isobutyl amine, and the like. The most useful complex products are those obtained using a primary amine especially a primary cycloalkyl amine such as cyclohexyl amine.

Any water-soluble inorganic zinc salt can be employed as the other reactant. Illustrative zinc salts of this nature are zinc chloride, zinc sulfate, zinc acetate, zinc bromide and zinc nitrate.

The following specific examples illustrate the preparation of the complex products according to this invention and also illustrate the superiority of the products prepared thereby over the products prepared by the methods suggested and used prior to the discovery of the improved method disclosed in this invention. In all the following examples the term "parts" is employed to indicate parts by weight.

Example I

An aqueous solution containing 26.8 parts (0.2 mole) of sodium dimethyl dithiocarbamate dissolved in 114 parts of water and an aqueous solution containing 10.9 parts (0.11 mole) of cyclohexyl amine in 50 parts of water were added to a reaction vessel. While the aqueous solution was being mildly stirred, an aqueous solution containing 28.7 parts of zinc sulfate heptahydrate dissolved in 30 parts of water was rapidly added to the reactor. The resulting aqueous solution was heated to a temperature between 55° and 60° C. and maintained at that temperature for 30 minutes, after which it was cooled and filtered to recover the precipitated complex product which had formed. This product was washed with water and air dried. In this manner 31.2 parts (a 77.3% yield based on the 0.1 mole zinc sulfate employed of the zinc dimethyl dithiocarbamate-cyclohexyl amine product were recovered. This product was found to contain 22.3% chemically combined cyclohexyl amine or, in other words, substantially all the reactants had entered into the complex formation leaving no free zinc dithiocarbamate.

Example II

The preparation described in Example I was repeated except that the aqueous solution containing the reactants was heated for 90 minutes. The yield of the zinc dimethyl dithiocarbamate-cyclohexyl amine complex reaction product was 37.6 parts (93.5% based on the 0.1 mole of zinc sulfate employed) and contained 23.2% chemically combined cyclohexyl amine.

The following is an example of the method of the prior art.

Example III

The same quantities of reactants as used in Example I were again employed, but in this preparation the solution of zinc sulfate was added to the aqueous solution of sodium dimethyl dithiocarbamate to first form the zinc dithiocarbamate. Then the resulting mixture was heated to about 55° C. and stirred vigorously to maintain a uniform slurry of the precipitated zinc dithiocarbamate which formed. Then the aqueous solution of cyclohexyl amine was added. This mixture was maintained at 55° to 60° C. for 30 minutes and was then cooled and filtered to recover the zinc dithiocarbamate amine product which had formed. In this manner only 28.8 parts (a 71.4% yield based on the 0.1 mole zinc sulfate employed) of the desired product was recovered. It was found that this product contained appreciable amounts of free zinc dithiocarbamate.

The following example demonstrates that the product prepared by the method of this invention is superior to that prepared by the method of the prior art.

*Example IV*

An aqueous solution containing about 0.001% by weight of Triton N–100, a tertiary octyl-phenoxy poly-ether alcohol, as a dispersing agent was prepared. In aliquot portions of this aqueous solution there was dispersed 10% by weight of the products of Examples I, II and III. These three dispersions were allowed to stand for one hour. There were no settlings in the dispersions containing the complex products of Examples I and II but the dispersion containing the complex product of Example III was unsatisfactory for horticultural sprays for it contained considerable solids which had settled out. These solids represented 26.8% of the complex zinc dithiocarbamate-cyclohexyl amine reaction product originally dispersed therein. These settlings were found to contain 18.6% cyclohexyl amine while the solids before being dispersed had contained 21.5% cyclohexyl amine. Thus the product of Example III not only would not form a dispersion suitable for spraying but was not a homogeneous material and thus not a pure chemical compound. Also there was present in the dispersed solids and in the settlings a quantity of free zinc dimethyl dithiocarbamate which is phytotoxic and causes injury and leaf burn, when the dispersion is sprayed on plant life. In contrast, the dispersions of the products of Examples I and II were completely non-phytotoxic.

Although the above specific illustrative examples employed sodium dimethyl dithiocarbamate as a reactant, it will be understood that any water-soluble salt of any dithiocarbamic acid can be employed in the improved process hereinabove described, for it is readily apparent that the substituents on the amino nitrogen atom of the dithiocarbamate acid will not in any way enter into the reaction. Other variations and modifications in the nature of the reactants as described herein may also be effected without departing from the spirit and scope of the invention as defined in the appended claims.

I claim:

1. The method which comprises preparing an aqueous solution containing substantially two moles of a water-soluble dithiocarbamate and substantially one mole of an amine selected from the class consisting of alicyclic, aliphatic and saturated heterocyclic amines, adding to this solution an aqueous solution of substantially one mole of a water-soluble inorganic zinc salt, stirring and heating the resulting solution to a temperature between 50° C. and 100° C. for about one-half to two hours, thereby to produce in a crystalline and substantially pure form a complex chemical compound chemically identical with the product resulting from the reaction of a zinc dithiocarbamate and said amine.

2. The method of claim 1 where the first aqueous solution is prepared by combining an aqueous solution containing substantially two moles of the dithiocarbamate with an aqueous solution containing substantially one mole of the amine.

3. The method of claim 1 where the water-soluble dithiocarbamate is a sodium dialkyl dithiocarbamate and the amine is cyclohexyl amine.

4. The method which comprises preparing an aqueous solution containing substantially two moles of a sodium dialkyldithiocarbamate and substantially one mole of cyclohexylamine, adding to this solution an aqueous solution containing substantially one mole of zinc sulfate, stirring and heating the resulting solution to a temperature between 50° C. and 100° C. for about one-half to two hours, thereby to produce in a crystalline and substantially pure form a complex chemical compound chemically identical with the product resulting from the reaction of a zinc dialkyldithiocarbamate with cyclohexylamine.

5. The method which comprises preparing an aqueous solution containing substantially two moles of sodium dimethyldithiocarbamate and substantially one mole of cyclohexyl amine, adding to the solution an aqueous solution containing substantially one mole of zinc sulfate, stirring and heating the resulting solution to a temperature between 50° C. and 100° C. for about one-half to two hours, thereby to produce in a crystalline and substantially pure form a complex chemical compound chemically identical with the product resulting from the reaction of zinc dimethyldithiocarbamate with cyclohexyl amine.

JOHN C. McCOOL.

REFERENCES CITED

The following references are of record in the file of this patent:

UNITED STATES PATENTS

| Number | Name | Date |
| --- | --- | --- |
| 2,321,301 | Lichty | June 8, 1943 |
| 2,443,161 | Gillette | June 8, 1948 |